United States Patent [19]

Kamitake et al.

[11] Patent Number: 4,862,501
[45] Date of Patent: Aug. 29, 1989

[54] COMMUNICATIONS NETWORK USING IC CARDS

[75] Inventors: Takashi Kamitake, Tokyo; Hiroyuki Mizutani; Shin-ichi Kawamura, both of Yokohama, all of Japan

[73] Assignee: Kabushiki Kaisha Toshiba, Kawasaki, Japan

[21] Appl. No.: 836,163

[22] Filed: Mar. 4, 1986

[30] Foreign Application Priority Data

Mar. 8, 1985 [JP] Japan ................................ 60-46012

[51] Int. Cl.$^4$ ............................................. H04K 3/00
[52] U.S. Cl. ...................................... 380/50; 380/25; 380/28; 235/380
[58] Field of Search ............... 178/22.08, 22.09, 22.13, 178/22.10; 340/825.34; 235/379, 380, 381, 382; 380/23, 24, 25, 28, 43, 29, 30, 49, 50

[56] References Cited

U.S. PATENT DOCUMENTS

| | | | |
|---|---|---|---|
| 4,215,421 | 7/1980 | Giraud | 364/900 |
| 4,349,695 | 9/1982 | Morgan et al. | 178/22.08 |
| 4,549,075 | 10/1985 | Saada et al. | 178/22.08 |
| 4,575,621 | 3/1986 | Dreifus | 380/25 |
| 4,656,474 | 4/1987 | Mollier et al. | 380/23 |
| 4,731,842 | 3/1988 | Smith | 380/24 |
| 4,745,267 | 5/1988 | Davis et al. | 380/24 X |
| 4,752,676 | 6/1988 | Leonard et al. | 380/24 X |

FOREIGN PATENT DOCUMENTS 0063794 11/1982 European Pat. Off. .
2473755 7/1981 France .
2526977 11/1983 France .
1399020 6/1975 United Kingdom .

OTHER PUBLICATIONS

IEEE Spectrum, vol. 21, No. 2, Feb. 1984, pp. 43-49, IEEE New York, US; S. B. Weinstein: "Smart Credit Cards: The Answer to Cashless Shopping", *p. 47, right-hand column, lines 20-58*.

Primary Examiner—Stephen C. Buczinski
Assistant Examiner—Bernarr Earl Gregory
Attorney, Agent, or Firm—Oblon, Spivak, McClelland, Maier & Neustadt

[57] ABSTRACT

A communications network has a plurality of customer terminals and a single center terminal which are coupled through communication lines. A large scale integrated circuit is operatively coupled to each terminal. The integrated circuit device has enciphering and deciphering functions and has a recording device. When a transaction request message is sent from one customer terminal to the center, the transaction request message is enciphered by the integrated circuit device, and the enciphered message is sent to the center. In order to increase the transaction verification capability, the transmission message is recorded, in association with encryption of the transmission message, in an area of the recording device which can be accessed from outside only for readout. In order to further improve the transaction verification capability, the response message is enciphered by the integrated circuit device in the center. The enciphered response message is deciphered by the integrated circuit device in the customer terminal. The response message is recorded in the area of the recording device such that the encrypted message and decrypted message can be distinguished from each other.

12 Claims, 9 Drawing Sheets

| | USER | | ISSUER | | TYPE |
|---|---|---|---|---|---|
| | W | R | W | R | |
| AREA II | × | × | ○ | ○ | 1 |
| AREA III | × | ○ | ○ | ○ | 2 |
| AREA IV | × | × | ○ | ○ | 1 |
| AREA V | × | ○ | × | ○ | 3 |

FIG. 6

| AREA No. | ACCESS TYPE | AREA START ADDRESS |
|---|---|---|
| II | 1 | 0 0 0 0 H |
| III | 2 | -------- |
| IV | 1 | -------- |
| V | 3 | -------- |

FIG. 7

FUNCTIONAL COMMAND

| COMMAND CODE | AREA NO. | DATA |

COMMUNICATIONS NETWORK USING IC CARDS

BACKGROUND OF THE INVENTION

The present invention relates to a communications network and, more particularly, to a communications network that enables transactions based on encrypted messages between terminals.

Recently, with developments in electronic technology, there have been innovations in communications network systems such as home banking and home shopping, and office banking systems. A vital concern regarding communications network systems for handling financial transactions is guaranteeing secrecy and security for these transactions. It is necessary to increase the verifiability of a transactor's identity or a message which is transmitted and received between transactors through the communications network.

The classical types of irregularities that can occur in the transmission of transactions or messages are as follows:

(1) False reports: A sender reports not sending to the receiver although a transmission was in fact made, or the sender reports sending although no transmission was made.

(2) Forgery of documents: A receiver rewrites a communication message that has been recorded on the receiving side, or forges a communication message.

These irregularities make embezzlement possible.

In a prior art system, in order to prevent such irregularities, an enciphering program such as DES (Data Encryption Standard) is stored in each network terminal to prevent the forging of communication messages. This means that an enciphering/deciphering circuit is provided in each terminal and that a sender, using his own key, enciphers a message according to this enciphering program. The enciphered message is transmitted to a receiver terminal through a communications network. On the receiver side, the received enciphered message is deciphered in the deciphering circuit using a key word which is stored in a key memory and is peculiar to the sender and then recorded. Accordingly, assuming that the key word stored in the key memory on the receiver side has not been leaked to the outside, and that the receiver has not forged the message, there is no one other than the sender who knows the key word who can make the enciphered message. Accordingly, the verifiability of the enciphered message stored on the receiver side is very high. Therefore, a digital signature can be made on the communication document. However, when the receiver changes his terminal operation mode from the decryption mode to the encryption mode, he can make an enciphered message using the sender's key word. Therefore, in a communication network system based on an encryption/decryption scheme, irregularities between the sender and the receiver cannot be perfectly prevented, thus failing to guarantee the security of transactions.

Copending U.S. patent application Ser. No. 739,282 filed on May 30, 1985; entitled "COMMUNICATIONS NETWORK USING AN ENCIPHERING AND DECIPHERING DEVICE" which has been abandoned as part of File Wrapper Continuation, Ser. No. 14,213, now U.S. Pat. No. 4,823,388; and assigned to the same assignee as this application discloses a communication network with LSI devices, such as IC cards, for enciphering/deciphering messages using a plurality of key words.

SUMMARY OF THE INVENTION

It is an object of the present invention to provide a communications network for performing communications between terminals using enciphered messages, which guarantees transaction security.

It is another object of the present invention to provide a communications network system for performing communications between terminals using enciphered messages which enables a safe digital signature.

In a communications network system according to the present invention, first and second communication terminals are coupled via a communications network. First and second integrated circuit devices having a semiconductor large scale integrated circuit sealed therein are operatively coupled to the first and second terminals, respectively. The first IC device has at least a function for enciphering a first kind of messages input from the first terminal. The second IC device has at least a function for deciphering an enciphered message input from the second terminal. The first kind of messages enciphered by the first IC device is sent from the first terminal to the second terminal via the communications network.

According to the present invention, the first IC device has recording means. Together with encryption of the first kind of messages input from the first terminal, the first IC device is arranged to automatically record the first kind of messages (to be sent to the second terminal) in an area of the recording means, the area being accessible from outside of the IC device only for readout.

Furthermore, according to the present invention, the second IC device has a function for enciphering a second kind of messages (to be sent to the first terminal) input from the second terminal in response to the first kind of messages. The first IC device has a function for deciphering the second kind of messages sent from the second terminal to the first terminal and then input to the IC device. Together with decryption of the enciphered message the first IC device is arranged to automatically record the second kind of messages in the area of the recording means that is accessible from outside only for readout.

In the first IC device, the first and second kinds of messages are recorded in the area of the recording means in such a way that the distinction between the first kind of messages to be enciphered and the second kind of messages which has been deciphered can be made.

DETAILED DESCRIPTION OF THE PREFERRED EMBODIMENTS

Figure 1:
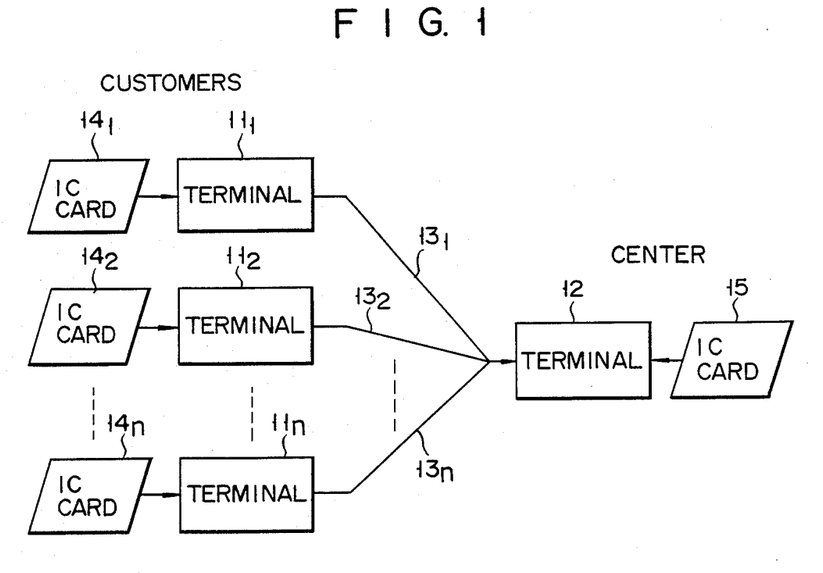
FIG. 1 is a schematic diagram of a communication system to which the present invention is applied.

FIG. 1 schematically shows a communications network, which is used for home banking and shopping, and office banking systems, and uses IC (integrated circuit) cards having an encryption/decryption function. This communications network is an n: 1 system. A plurality of customer terminals $11_1$, $11_2$, ... $11_{n_1}$ installed in homes or offices, are connected to a single center terminal 12, installed in a bank or department store, via communication lines $13_1$, $13_2$, ... $13_n$. In this embodiment, a transaction request message M is sent from customer terminal 11 to center terminal 12. Terminals $11_1$ to $11_n$ are equipped with insertable IC cards $14_1$ to $14_n$ which are enciphering devices, respectively. Central terminal 12 is equipped with an insertable IC card 15 which is a deciphering device.

Figure 2:
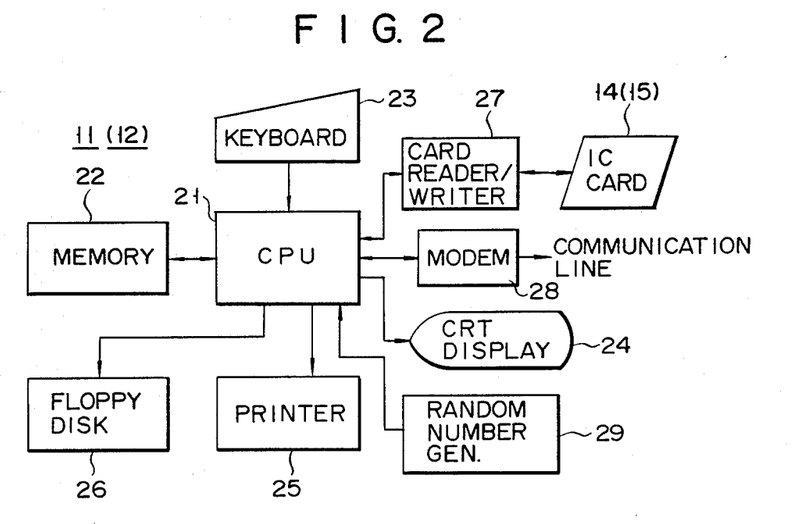
FIG. 2 is a block diagram of terminals in FIG. 1.

FIG. 2 shows an arrangement of a customer or center terminal. The terminal is basically constituted by an information processing device such as a personal computer. To a central processing unit (CPU) 21 are coupled a memory 22 for storing a control program, a keyboard 23 as an input device, CRT display 24 and printer 25 which constitute an output device, and floppy disk drive 26 as in existing personal computers. A card reader/writer 27 is coupled to CPU 21. The IC card is loaded into reader/writer 27. Reader/writer 27 supplies information from CPU 21 to card 14 (15) or from card 14 (15) to CPU 21. CPU 21 is coupled to a communication line through a modem 28. A random number generator 29 is equipped in central terminal 12, which sends to CPU 21 random data R specifying a sending time of a transaction message or a transaction number, or authentication random number RN.

Figure 3:
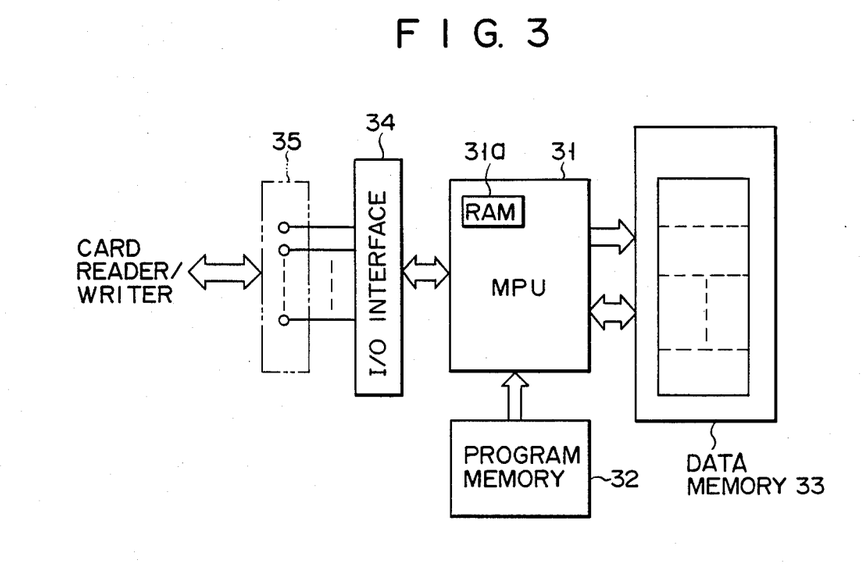
FIG. 3 is a block diagram of IC cards used in the system in FIG. 1.

A semiconductor LSI circuit is sealed in IC card, which is arranged such that only specific information can be read out from the IC card. The IC card used in the system of the present invention has the same basic arrangement as a conventional IC card. As shown in FIG. 3, the IC card comprises a microprocessor unit (MPU: one-chip microprocessor) 31, a program memory 32 (preferably a mask ROM or EPROM) for storing an encryption (decryption) program and an operation program, a data memory 33 (preferably permanent memory type PROM), an I/O interface 34 and contacts 35. When the IC card is loaded into reader/writer 27, an operation power source voltage, operation clock pulses, various function command codes and data are supplied to the IC card through contacts 35. MPU 31 incorporates a RAM (random access memory) $31a$.

Program memory 32 stores various programs for executing basic functions of the IC card. The basic functions of the IC card include a function for reading from or writing into memory 33, an enciphering/deciphering function for enciphering a message, to prevent leakage or forgery thereof, when sending the message from one terminal to another terminal through a communication line, and deciphering an enciphered message received from another terminal, and a password setting/verification function for storing a password set by a user in the data memory and verifying an input password with the stored password. MPU 31 translates a function command, with or without data, input from CPU 21 through reader/writer 27 and performs a necessary one of the basic functions.

Memory 33 is divided into a plurality of areas, e.g., an area accessible for external readout only, an area accessible for writing only, an area accessible for reading and writing, an area which permits no reading and writing and an area accessible for writing and reading only after password verification. These memory areas are assigned with area numbers. The designation of memory addresses is performed by specifying an area number. The access permit conditions for the data memory are determined in units of areas. The access permit conditions depend on accessor's qualification levels and access types (i.e., the writing and reading). The qualification levels include an IC card manufacturer, an IC card issuer and an IC card user. The qualification level of the IC card is detected by a signal input by an IC card holder. Memory access is inhibited or permitted in accordance with subsequent commands.

Reader/writer 27 links card 14 (15) with CPU 21 for communication of functional command codes and data therebetween, and translates macroinstructions from CPU 21 into commands for the IC card.

Figure 4:
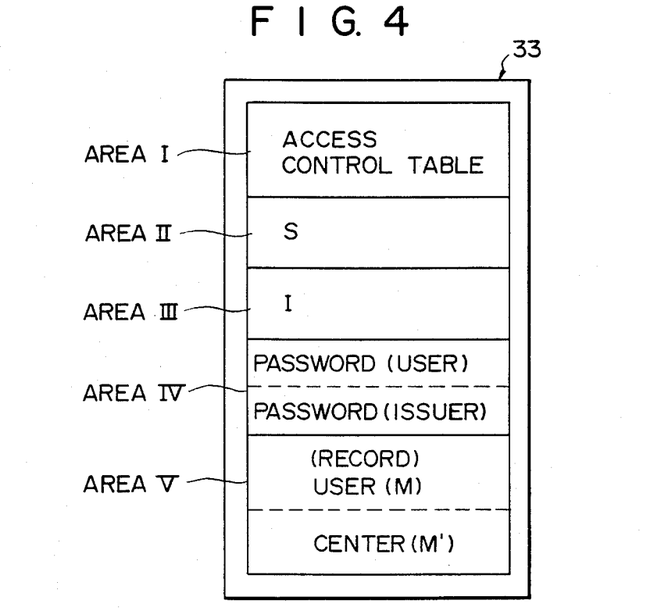
FIG. 4 is a diagram for explaining memory areas of a data memory in the IC card of FIG. 3.

FIG. 4 shows an arrangement of memory 33 in card 14. Memory 33 has five areas I, II, III, IV and V. An access control table for determining access permit conditions for other areas II to V is stored in area I. The secret key word S, personal key word (account number) I and passwords of user and issuer are respectively stored in areas II, III and IV at the issuance stage of the IC card. A user's transaction message M to be sent to the center and a center response message M' are stored in area V such that the discrimination between the transaction request message M from the user and the response message M' from the center is made possible.

Figure 5:
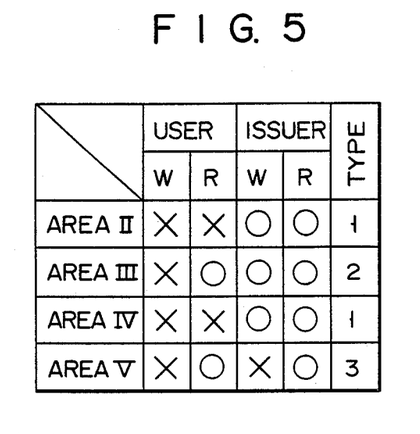
FIG. 5 is a table for explaining access enable conditions of the memory areas.

FIG. 5 is a table showing access permit conditions for areas II to V. The area II can be accessed only by the issuer for reading and writing. This access permit condition is defined as type 1. The area III can be accessed by users for readout only, but can be accessed by the issuer for reading and writing both. This access permit condition is defined as type 2. The area IV has, like area II, the access permit condition of type 1. The area V has access permit condition of type 3, in which the users and issuer can gain access for reading only.

Figure 6:
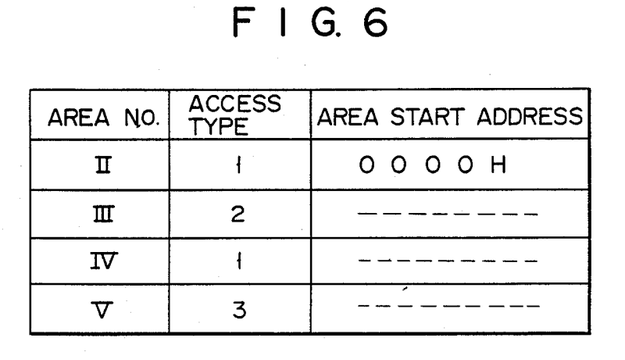
FIG. 6 shows an access enable condition table of the data memory.

FIG. 6 shows the access permit condition table stored in area I. Area numbers, the access permit condition types, and the respective start addresses of areas are registered in this table.

Figure 7:
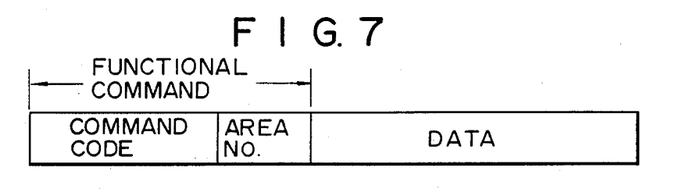
FIG. 7 is a format of a message applied to the IC card from the terminal.

A function command and data are supplied to the IC card in such a format as shown in FIG. 7. Only the function command may be supplied to the IC card. The function command includes a command code for specifying writing or reading and area number data specifying an area of memory 33. Upon reception of a message shown in FIG. 7, the IC card separates the message into the command code and the area number data. The IC card then references the access control table in the data memory area to read out the access-permit condition type information for a designated memory area. At the same time, the command code is translated to distinguish between writing and reading. After the IC card is loaded into the card reader/writer, password identification is performed at the first stage of processing. When an input password coincides with the user or issuer password registered in area IV in memory 33, a person using the IC card is determined to be the user or issuer. The user/issuer distinction data is then stored in RAM 31a in MPU 31. A determination is made as to whether a command is executed or not for a specified memory area in accordance with the user/issuer distinction data and the access permit condition data for the specified memory area. As a result, for example, even if the user wants to write a message in area V in memory 33 without sending to the center, the corresponding command is not executed and thus the message is not written in area V, as shown in FIG. 5.

In order to perform a transaction, a transaction request message M to be sent from a customer terminal to the center must be enciphered in the terminal, and an enciphered message C must be sent onto a communication line. As keys for enciphering the transaction message are used a key word such as an account number I set by the card user or issuer, a number (secret key word) S common to the communication network, and random number data R representing a transaction number and generated at the center side. MPU 31 performs an exclusive OR operation, i.e., $I \oplus S \oplus R$ to produce an enciphering key word K. The key word may be obtained by any other method than the exclusive OR operation. By way of example, the key word may be obtained by concatenating I and R, and then enciphering the concatenated I and R with the key word S. MPU 31 enciphers message M using the enciphering key word K and in accordance with an encryption algorithm such as the DES. When the encryption algorithm is defined as f, message C is defined as follows:

$$C = fK(M) = fs,I,R(M)$$

As described above, $K = \oplus I \oplus R$. The key word I inherent to a card user is stored in the predetermined area III which can be accessed by the user for reading only. The common key word S is stored in area II of data memory 33 such that it cannot be read out to the outside. The key word S is public only to a minority such as the card issuer. The key word R representing a transaction number is sent from a center terminal when a transaction is requested by the user and is stored in RAM 31a in MPU 31.

The enciphered message C and personal key word I are sent from a customer terminal to the center terminal. According to the present invention, whenever MPU 31 enciphers a message M, MPU 31 automatically records the message M in the predetermined area V in memory 33 such that the message M can be externally read out but cannot be externally rewritten or erased.

The center terminal 12 deciphers the enciphered message C sent from the customer terminal in accordance with a decryption algorithm to recover the original transaction message M. Terminal 12 sends the key word I sent from the customer terminal together with the message C to IC card 15. The center IC card 15 uses key words I, R and S to produce a decrypting key word K. The MPU deciphers the enciphered message C in accordance with the decryption algorithm using the key word K. If the decryption algorithm is defined as $f^{-1}$, the deciphered message M is given by:

$$M = f^{-1}K(C) = f^{-1}S,I,R(C)$$

where $K = S \oplus I \oplus R$.

The deciphered message M is output from card 15 to be printed out by printer 25. In center terminal 12, key words I and S are stored in the predetermined areas in memory 33 in the same manner as in customer terminal 11. Key word R is stored in RAM 31a in MPU 31.

In the center terminal the enciphered message C is deciphered, and then a responding message M' is produced, which is input to card 15. The message M' is enciphered to produce enciphered message C' in accordance with the same encryption algorithm as in card 14. Enciphered response message M' is sent back to the customer terminal which transmitted original message M.

Figure 8:
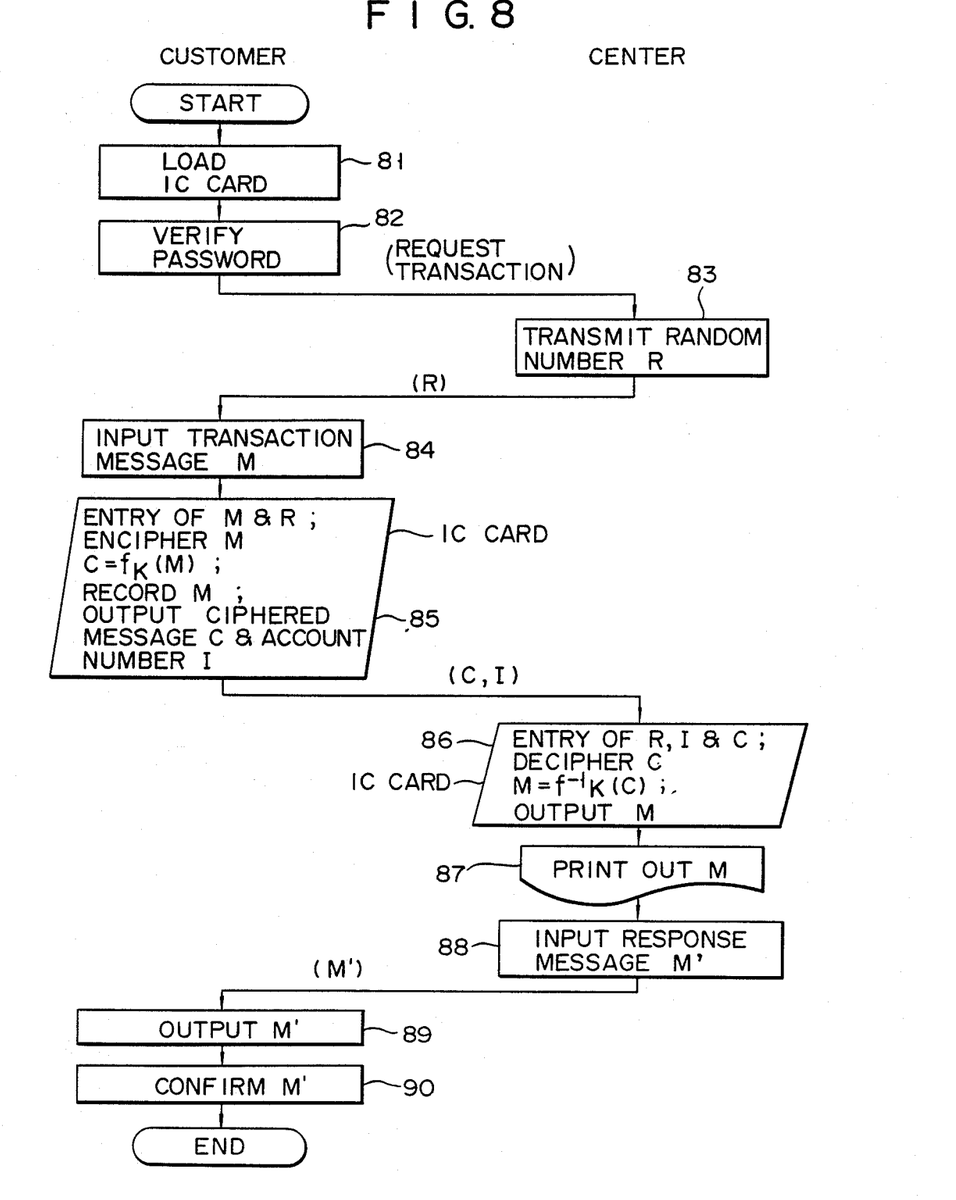
FIG. 8 is a flow chart for explaining a communication transaction according to a first embodiment of the present invention.

The general description of transactions using the communications network of the present invention will be described with reference to a flow chart of FIG. 8.

When a customer possessing card 14 sends message M to the center, he first loads his IC card into reader/writer 27 in his terminal (step 81). The customer is instructed to input his password. When the customer enters his password through keyboard 23, an input message with a format shown in FIG. 7 is sent from CPU 21 to card 14 through reader/writer 27. MPU 31 in card 14 translates the message and accesses memory 33 to read out a password from area IV. MPU 31 then compares the input password with the password read out from memory 33 (step 82). A comparison result is sent to CPU 21. When identification of the customer is confirmed, CPU 21 sends a transaction request signal to terminal 12 through line 13. Terminal 12 receives random number data R from generator 29 in response to the transaction request signal and sends data R to the customer terminal (step 83). The customer terminal supplies random number data R to IC card 14. Data R is stored in RAM 31a in MPU 31 in card 14, as previously described. Random number data R is also stored in card 15 on the center side.

Upon reception of data R, CPU 21 instructs entry of an input message to the customer. The customer types message M on keyboard 23 (step 84). CPU 21 supplies message M with a function command code in a format as shown in FIG. 7 to IC card 14 through reader/writer 27. MPU 31 in card 14 enciphers message M in accordance with the encryption algorithm of $C = fK(M)$. MPU 31 writes message M in area V in memory 33. Message C, and key word I stored in area III in memory 33 are read out under the control of MPU 31. CPU 21 in terminal 11 sends to terminal 12 through line 13 the enciphered message C and key word I (account number) output from card 14 (step 85).

Upon receiving message C and key word I, terminal 12 supplies them to card 15. Card 15 deciphers message C in accordance with the decryption algorithm of $M = f^{-1}K(C)$ as described above. Deciphered message M is thus output from card 15 (step 86). CPU 21 causes printer 25 to print out message M supplied from card 15 (step 87). Subsequently, message M' responding to message M is typed on keyboard 23 in the center (step 88). The responding message M' may be produced by a computer according to a constant routine. Center terminal 12 sends message M' to customer terminal 11 through line 13. Message M' from terminal 11 is visually output by printer 25 or CRT display 24 (step 89). The customer confirms whether message M' is acceptable or not. If acceptable, the transaction is completed (step 90).

According to the way of transactions, the irregularities can be prevented as described later.

As described above, the encryption of message M at each customer terminal is performed in association with the recording of the message in the data memory. As previously described, message M is recorded in area V in memory 33 so as to permit external readout but prohibit external rewriting. In other words, the transaction message M cannot be forged. If the center can confirm that the received enciphered message C has been properly enciphered, that is, a meaningful message has been obtained by the decryption of message C then it can be confirmed that the message M has been recorded in nonrewritable manner on the customer side. Since message M is recorded and preserved at the customer side, the transaction cannot be denied afterwards and therefore, the customer cannot report a false transaction.

The possibility of forging of message M at the center will be considered. In this case, a communication of message M is not performed in practice. Therefore, message M representing a transaction content is not recorded in the IC card of a customer. Therefore, a false report of the center can be denied by the fact that message M is not recorded in the customer IC card.

However, the transaction way described above involves a slight problem in transaction security. When a customer interrupts transmission of message M to the center after message M is recorded in his IC card, or when transmission is not performed due to a communication line failure, a false report can be made using message M recorded in card 14. This problem can be solved by enciphering response message M' at the center and recording the enciphered response message C' or deciphered response message M' in data memory 33 in customer's IC card 14.

Figure 9:
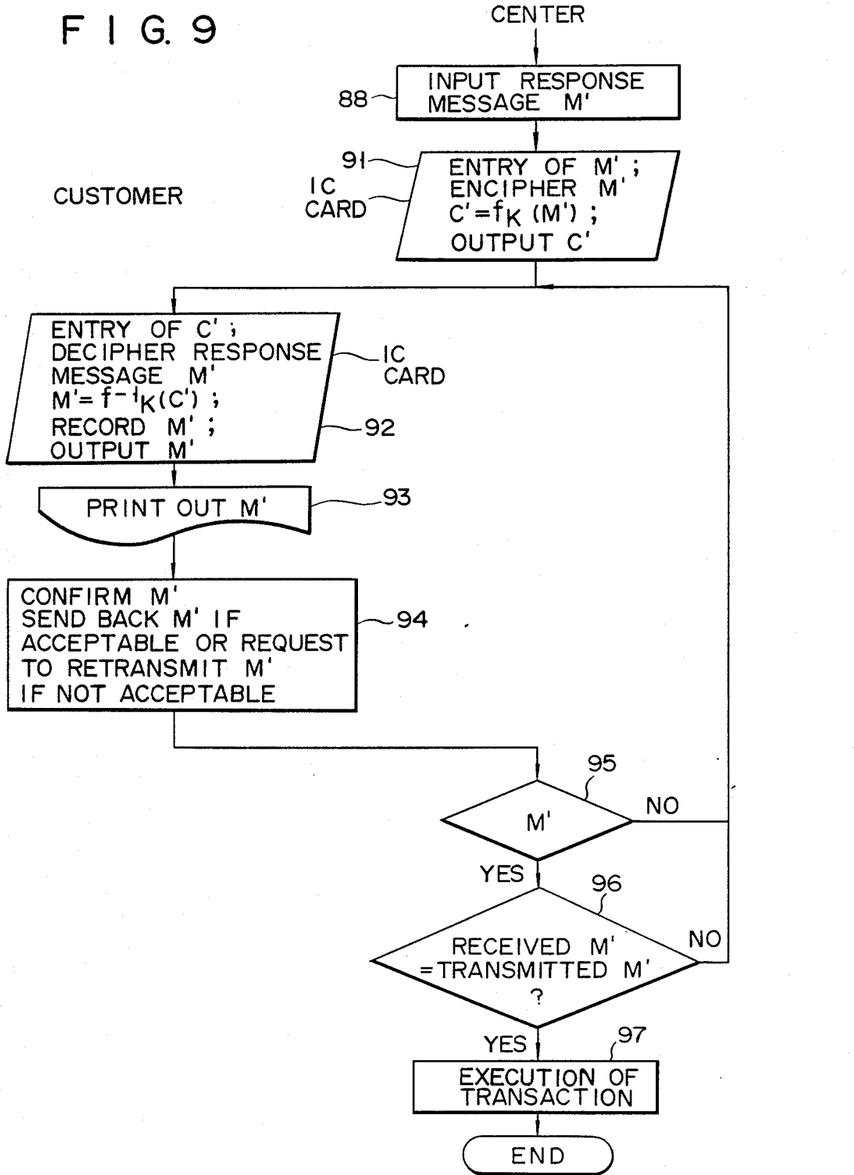
FIG. 9 is a flow chart for explaining a communication transaction according to a second embodiment of the present invention.

A sequence for preventing such inconvenience is shown in FIG. 9. Message M' is typed and then input into card 15. Message C' is enciphered in accordance with the encryption algorithm of C'=fK(M) and enciphered message C' is output from the IC card (step 91). Message C' is sent to the customer terminal. Message C' is input into card 14 and deciphered in accordance with the decryption algorithm of M'=f$^{-1}$K(C'), thereby reproducing message M'. Message M' is recorded in memory 33 and output from the IC card (step 92). Message M' from the IC card is printed out by printer 25 (step 93). The customer confirms message M' and, if acceptable, causes CPU 21 to send back message M' to center terminal 12. However, when the response message is not acceptable, CPU 21 sends a response message retransmission request instruction to center terminal 12 (step 94).

The center terminal determines whether or not the response from the customer terminal is the retransmission request for message M' (step 95). When message M' is sent back, a determination is made as to whether or not the received message M' coincides with the transmitted message M' (step 96). This can be done by visually displaying the recieved message M' at printer 25 or CRT display 24. When the coincidence is confirmed, the transaction is executed (step 97). However, when the retransmission of the response message is requested in step 95 or when the coincidence has not been established in step 96, the center terminal retransmits message M' to the customer terminal without executing the transaction.

As stated above, the recording of the response message from the center terminal at the customer terminal disables a false report of the customer.

Another embodiment of the present invention will be described.

Figure 10:
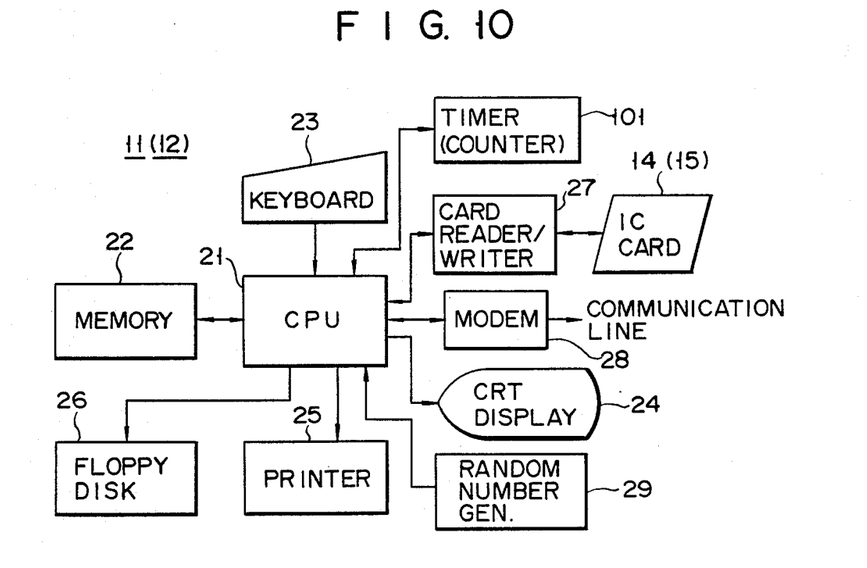
FIG. 10 is a block diagram of a terminal suitable for detecting communications network failures.
Figure 11:
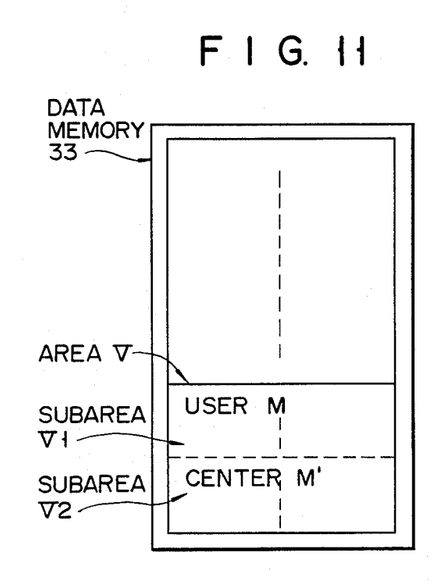
FIGS. 11 and 12 are diagrams for explaining recording methods for recording a transaction request message which is to be enciphered and a response message which has been deciphered in a data memory area in a distinguishable manner.
Figure 12:
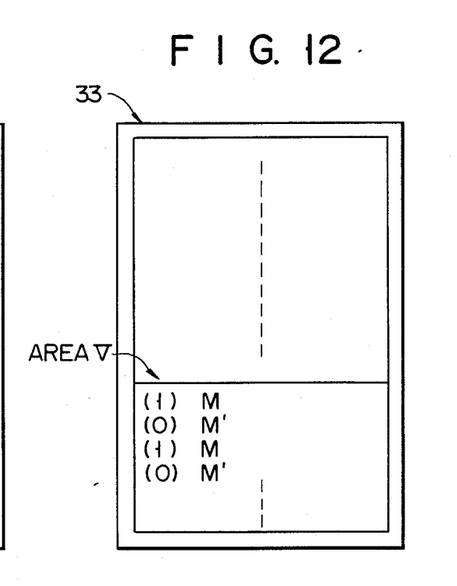

Referring to FIG. 10, the arrangement of customer terminal 11 and center terminal 12 used in this embodiment is shown which is basically the same as that in FIG. 2. A timer (or counter) 101 is coupled to CPU 21 to detect an abnormal state, such as a failure in the communication line between the customer and center terminals. In this embodiment, message M from the customer to the center and response message M' from the center to the customer are stored in data memory 33 in IC card 14 in such a way that the distinguishment between encryption and description of messages is made. For this purpose, as shown in FIG. 11, area V of memory 33 may be divided into subareas V1 and V2. Message M from the customer to the center is automatically recorded in subarea V1 in association with its encryption. Message M' from the center to the customer is automatically recorded in subarea V2 in association with decryption of message C'. Otherwise, as shown in FIG. 12, distinction information such as "1" or "0" may be added ahead of messages M and M' so as to distinguish message M from message M'. With such a distinguishable recording of messages M and M', the customer cannot make a false report that a transmitted message is a received one.

Figure 13:
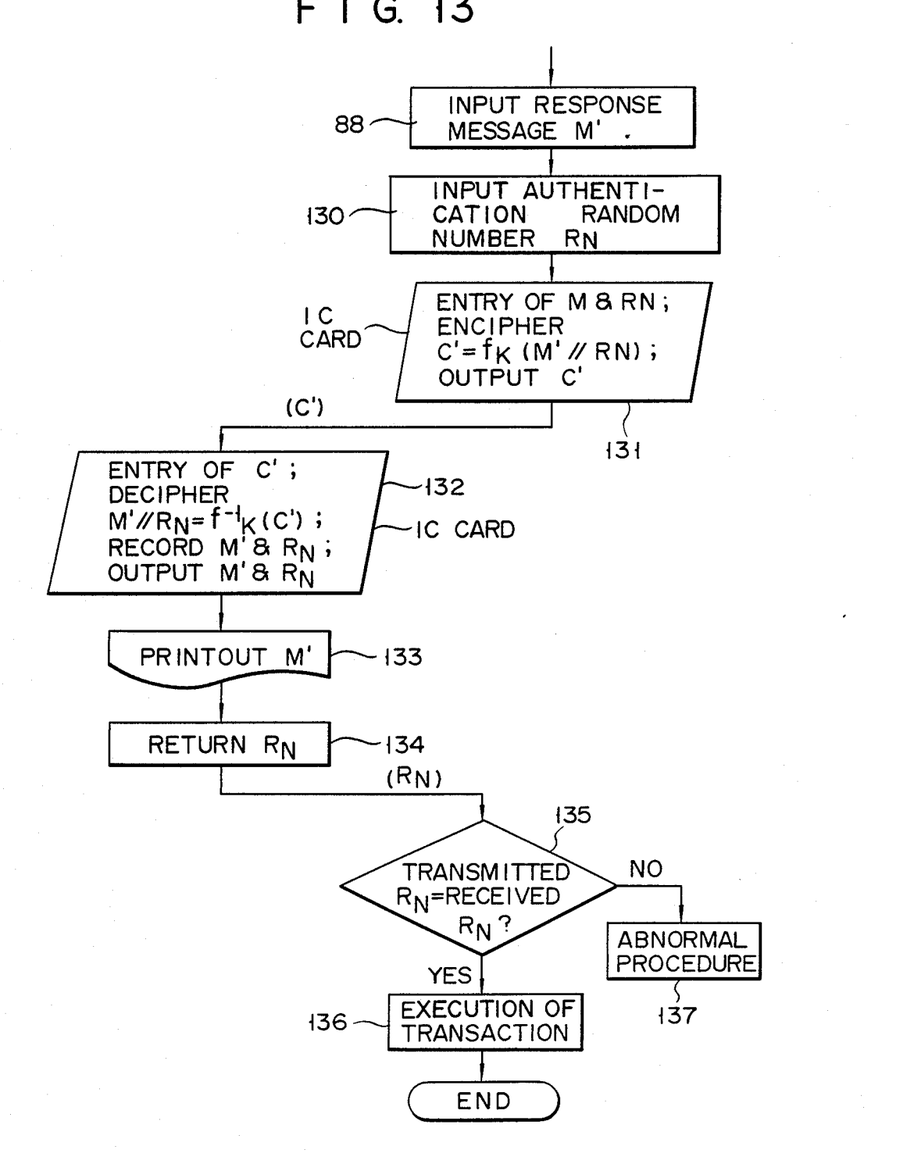
FIG. 13 is a flow chart for explaining a communication transaction according to another embodiment of the present invention.

With reference to the flow chart shown in FIG. 13, the portions different from FIG. 8 will be described. Steps 81 to 88 up to production of message M' at the center are the same as those in FIG. 8.

In this embodiment, message M' is produced and at the same time a random number RN used for an authentication of the transaction is supplied to CPU 21 in the center (step 130). Message M' and authentication random number RN are input to card 15. Authentication information RN is stored in RAM 31a in MPU 31 of card 15. A concatenation M'//RN of message M' and number RN is enciphered in card 15 in accordance with the encryption algorithm of C'=fK(M'//RN), and enciphered message C' is output from card 15 (step 131). Thus, M'//RN represents a message in which M' is disposed on the side of upper significant bits and RN on the side of lower significant bits. Message C' is sent to the customer terminal through the communication line. At the customer terminal, message C' is input to card 14, M'//RN is deciphered in accordance with the decryption algorithm of M'//RN=f$^{-1}$K(C), and M' and RN are automatically recorded in memory 33. Message M' and number RN are then output from card 14 (step 132). Message M' is printed out in step 133. In the subsequent step 134, authentication data RN is sent back to the center terminal. The transmitted authentication data RN is compared in the center terminal with the received authentication data (step 135). The confirmation as to whether or not the coincidence is found between the transmitted and received authentication data may be made by displaying them on the CRT display or printing at the printer. Alternatively, the confirmation may be made in the routine in the CPU. Upon confirmation of the coincidence, the content of the transaction request is executed with the result that the transaction communication is completed (step 136).

When all procedures are completed normally, as described above, the transaction and response messages are always stored in a pair in memory 33 of card 14. Since the content of these messages coincides with the actual transaction content, a transaction verification is realized. However, an unexpected interruption of a transaction communication may occur due to a communication line failure and external disturbance. A noncoincidence may also occur in step 135. In such a case, a noncoincidence between the actual transaction content and the recorded content in the IC card occurs, so that the transaction verification cannot be done. Therefore, the transaction verification cannot be regarded to be valid without detection of possible communication accidents and subsequent proper processing.

Figure 14A:
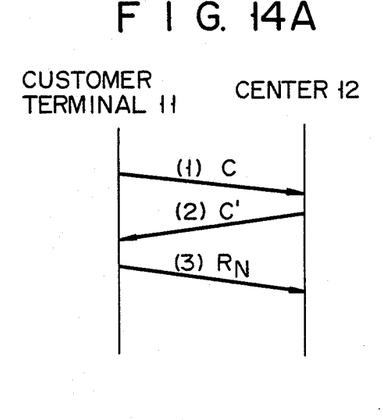
FIGS. 14A to 14E are diagrams for explaining detecting methods of communications network failures.

As shown in FIG. 14A, messages necessary for establishing the transaction are (1) transaction request message M (C on the communication line) from customer terminal 11 to center terminal 12, (2) response message M' and authentication data RN (C' on the transmission line) responding to message M, and (3) acknowledging message RN sent back from the customer terminal to the center.

An accident to interrupt at least one of the three messages is vital to the transactions using the communication network. A problem arising from such a failure cannot be solved by the communication network itself. For this reason, some measures must be taken. For example, the center temporarily disables the use of the customer IC card, and informs customers of transaction abnormality through means such as indication at a customer terminal, telephone call, or mail, and instructs the customer to bring his IC card to the center. "Abnormal procedure" (step 137 in FIG. 13) means mainly the above measures.

The practical communication failures and countermeasures therefor will be described below.

Figure 14B:
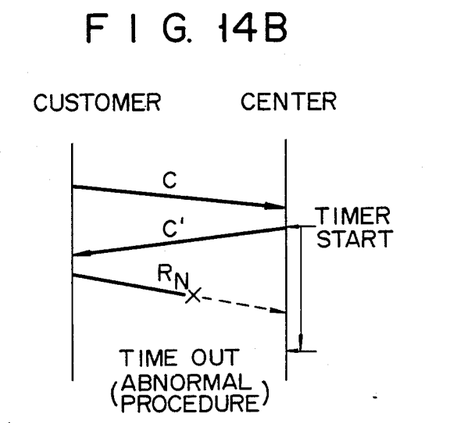

As shown in FIG. 14B, in a case where random number RN sent from the center does not coincide with the received random number, or message (3) is interrupted, messages (1) and (2) have been transmitted and received normally. The transaction content is recorded in the customer's IC card. However, a transaction has not been completed due to the noncoincidence of the transmitted and received numbers RN or to the interruption of message (3). Therefore, a difference between the recorded content and the actual transaction content occurs. In order to solve this problem, the above abnormal procedure must be performed to correct the noncoincidence between the recorded content in the IC card and the actual transaction content.

Figure 14C:
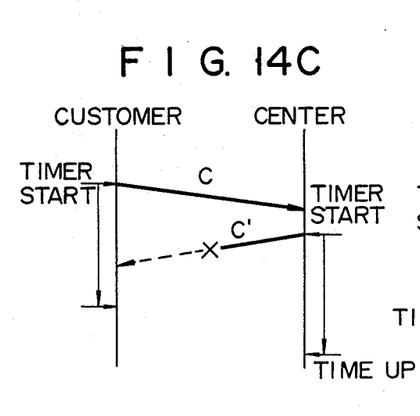
Figure 14D:
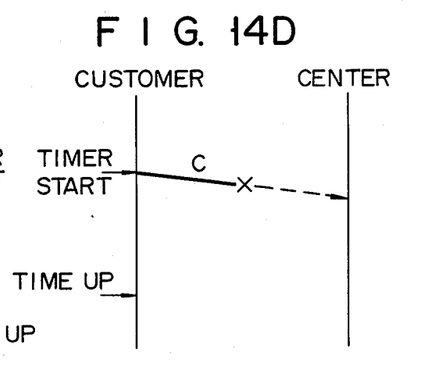

As shown in FIG. 14C, on the other hand, when a line failure occurs so that message (1) or (2) is interrupted, the transaction request is recorded in the IC card, but a response from the center is not recorded therein. In this case, the recorded content coincides with the actual transaction content because the transaction has been completed without execution. So far as it is concerned, no serious problem arises. The abnormal procedure for this failure may be easier than that in the failure of FIG. 14B. For example, it is to retry the transaction procedure from the first step, and perform the above abnormal procedure only when the normal transaction is impossible in spite of the retrial of the transaction procedure. In either case, the failure must be quickly detected.

Figure 14E:
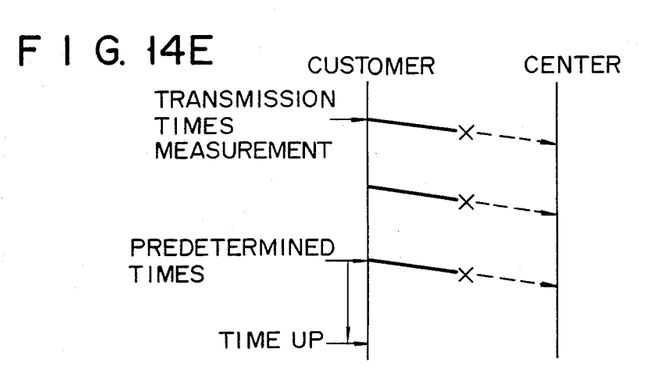

The method of detecting failures will be described later. As shown in FIG. 14B, an interruption failure of transaction request message M sent from the customer terminal to the center can be detected by the fact that response message C' is not transmitted from the center. The customer terminal awaits the response from the center for a predetermined period of time after the transaction request is made. When the response is not sent back within the predetermined period of time, the customer terminal determines that the failure has occurred. The predetermined period of time is set to be a duration long enough for the center terminal to send back a response to message M to the originating customer terminal. The response wait time is measured by a timer 101 in FIG. 10. Alternatively, as shown in FIG. 14E, it is possible to send message M' from the customer terminal to the center a plurality of times until the customer terminal receives the response message from the center. When the network is normally operated, the center sends back the response message to the corresponding customer terminal in response to the first transaction request. However, the response may be sent back in response to the second or subsequent transaction request due to line failure or center procedure delay. Therefore, when the response is not sent back in spite of a predetermined times of transaction requests, the abnormal procedure may be performed. For this purpose, the timer is required to have a function for counting the times of transmission of transaction request.

For a failure wherein message M' transmitted from the center is not received by the customer terminal, respective procedures at the customer and center terminals must be determined in advance. In this case, the customer procedure may be identical to that as in the above case wherein message M does not reach the center. When normal communication is performed, the center terminal receives number RN from the customer terminal in response to the reception of message M'. If message M' does not reach the customer terminal, then number RN is not sent back to the center. This can be regarded as a communication failure. For this purpose, the center operates its timer from a point of time when response message M' is transmitted. The abnormality procedure is performed when number RN is not received from the customer terminal within a predetermined period of time.

Figure 15:
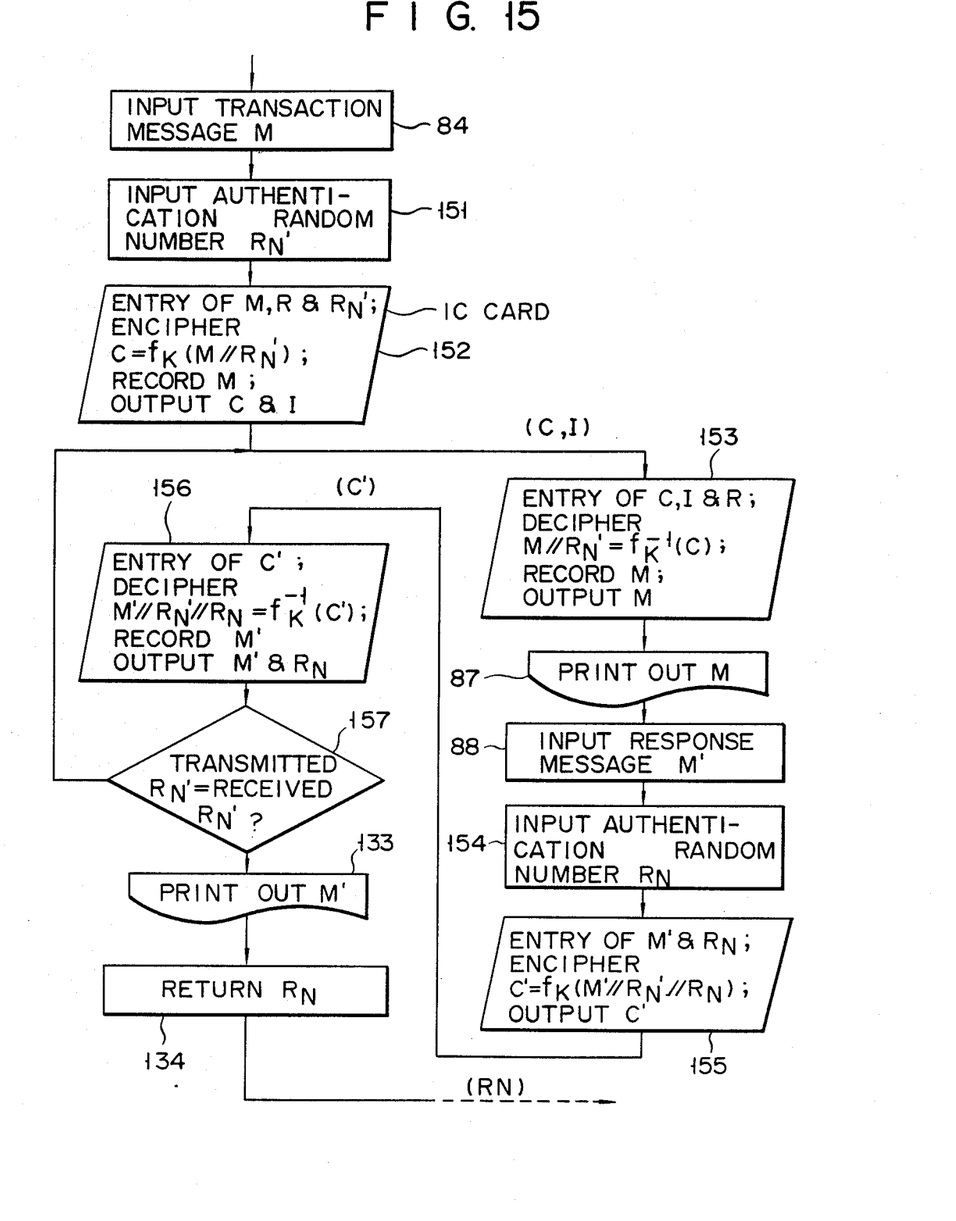
FIG. 15 is a flow chart for explaining a communication transaction according to still another embodiment of the present invention.

Still another embodiment of the present invention will be described with reference to FIG. 15. In this embodiment, the customer and center terminals transmit their authentication random numbers RN and R'N to their destinations as evidences of the decryption of messages M and M' at the center and the customer terminal, and send back the received random numbers to their sources.

In step 151, authentication random number R'N is fetched by CPU 21 in a customer terminal. Number RN from the center, message M, and number R'N are input to the IC card. In the IC card, M//RN' is enciphered using the key words I, S and R as previously described. Transaction request message M is recorded in association with encryption. Message C and key word I are sent to the center (step 152). M//RN' is deciphered by the center IC card in accordance with the decryption algorithm, and message M is recorded in the data memory (step 153). After message M' is produced, M'//R'N//RN is enciphered to produce message C', in accordance with the decryption algorithm (step 155). Message C' is sent to the customer terminal, so that M'//R'N//RN is deciphered in card 14. In response to this operation, message M is recorded and is read out of card 14 (step 156). Transmitted random number R'N and received random number R'N are compared in card 14 (step 157). When a coincidence between the transmitted and received random numbers is established, message M' is printed out. Subsequently, number RN transmitted from the center is sent back to the center. The same operation as shown in FIG. 13 is performed.

In the above embodiments, the IC cards are used as an encryption/decryption device. However, the encryption/decryption device is not limited to be of the configuration of a card. Furthermore, the encryption/decryption algorithm is not limited to the DES.

What is claimed is:

1. A communication system comprising:
   a first communicating terminal and a second communication terminal coupled to each other through a communication line; and
   first and second integrated circuit card devices adapted for coupling with said first and second communication terminals, respectively;
   said first integrated circuit card device comprising first integrated circuit means for enciphering each of first kinds of messages supplied from said first communication terminal for transmission to said second communication terminal over said communication line, and a nonerasable integrated circuit memory, coupled to said first integrated circuit means, which can be accessed from outside of said first integrated circuit card device for readout, said first integrated circuit means being arranged to automatically store each of the first kinds of messages in said nonerasable integrated circuit memory;
   said second integrated circuit card device comprising second integrated circuit means for deciphering each of the enciphered first kinds of messages transmitted from said first communication terminal and supplied from said second communication terminal;
   wherein said second integrated circuit means further comprises means for enciphering each of second kinds of messages supplied from said second communication terminal, and wherein said first integrated circuit means comprises means for deciphering each of the enciphered second kinds of messages transmitted from said second communication terminal to said first communication terminal and supplied from said first communication terminal and to automatically store each of the second kinds of messages deciphered by said first integrated circuit means in said nonerasable integrated circuit memory.

2. A system according to claim 1, wherein said first integrated circuit means comprises means for storing each of the first and second kinds of messages in said integrated circuit memory such that the first and second kinds of messages are stored in different data storage areas of said integrated circuit memory.

3. A system according to claim 2, wherein the first and second kinds of messages are stored in said nonerasable integrated circuit memory with data for distinguishing between the first and second kinds of messages.

4. A system according to claim 1, wherein said second communication terminal comprises means for supplying the second kind of message to said second integrated circuit card device as a response message to the first kind of message, and said second integrated circuit means comprises means for enciphering the second kind of message supplied from said second communication terminal, the enciphered second kind of message being transmitted from said second communication terminal to said first communication terminal over said communication line, and wherein said first communication terminal comprising means for supplying the enciphered second kind of message to said first integrated circuit card device, and said first integrated circuit means comprises means for deciphering the enciphered second kind of message, and automatically storing the deciphered second kind of message in said nonerasable integrated circuit memory, the deciphered second kind of message being outputted to said first communication terminal, and wherein said first communication terminal comprises means for sending the second kind of message back to said second communication terminal.

5. A system according to claim 1, wherein said second communication terminal comprises means for supplying to said second integrated circuit card device the second kind of message containing a response message to the first kind of message and authentication data, and said second integrated circuit comprises means for enciphering the second kind of message supplied from said second communication terminal, the enciphered second kind of message being transmitted from said second communication terminal to said first communication terminal over said communication line, and wherein said first communication terminal comprises means for supplying the enciphered second kind of message to said first integrated circuit card device, and said first integrated circuit means comprises means for deciphering the enciphered second kind of message supplied from said first communication terminal and automatically storing the deciphered second kind of message in said nonerasable integrated circuit memory, the deciphered second kind of message being outputted to said first communication terminal.

6. A system according to claim 5, wherein said first communication terminal comprises means for extracting the authentication data from the deciphered second kind of message and sending the authentication data back to said second communication terminal over said communication line, and wherein said second communication terminal comprises means for comparing the authentication data transmitted to said first communication terminal and the authentication data sent back from said first communication terminal in order to determine as to whether the enciphered second kind of message has been properly deciphered by said first integrated circuit means.

7. A system according to claim 5, wherein the authentication data is a random number generated by said second communication terminal.

8. A system according to claim 1, wherein the second kind of message contains a response message to the first kind of message and authentication data, and said second integrated circuit means comprises means for enciphering the second kind of message supplied from said second communication terminal, the enciphered second kind of message being transmitted from said second communication terminal to said first communication terminal over said communication line, and wherein said first communication terminal comprises means for supplying the enciphered second kind of message to said first integrated circuit card device, and said first integrated circuit means comprises means for deciphering the enciphered second kind of message entered from said first communication terminal and automatically storing the deciphered second kind of message in said nonerasable integrated circuit memory, the deciphered second kind of message being outputted to said first communication terminal.

9. A system according to claim 1, wherein the first kind of message contains a transmission message and authentication data, wherein said first integrated circuit means comprises means for enciphering the first message and automatically storing the first kind of message in said nonerasable integrated circuit memory, the enciphered first kind of message being outputted to said first communication terminal for transmission to said second communication terminal over said communication line, wherein said second communication terminal comprises means for supplying to said second integrated circuit card device the enciphered first kind of message to be deciphered by said second integrated circuit means and the second kind of message containing a response message and the deciphered authentication data, wherein said second integrated circuit means comprises means for enciphering the second kind of message, the enciphered second kind of message being transmitted to said first communication terminal, where in said first integrated circuit means comprises means for deciphering the enciphered second kind of message and automatically storing the deciphered second kind of message in said nonerasable integrated circuit memory, and wherein said first communication terminal comprises means for comparing the authentication data transmitted to said second communication terminal and the authentication data sent back from said second communication terminal in order to determine as to whether the enciphered first kind of message has been properly deciphered by said second integrated circuit means.

10. An integrated circuit card device comprising:
   integrated circuit means for enciphering each of first kind of messages supplied from a first communication terminal for transmission to a remote second communication terminal over a communication line; and
   a nonerasable integrated circuit memory device, coupled to said integrated circuit means, which can be accessed from outside of said integrated circuit card device for readout;
   said integrated circuit means comprising means for automatically storing each of the first kind of messages in said nonerasable integrated circuit memory device, each of the enciphered first kind of messages being adapted for transmission through said first communication terminal to said remote second communication terminal over said communication line;
   wherein said integrated circuit means further comprises means for deciphering an enciphered second kind of message transmitted from said remote second communication terminal over said communication line and supplied from said first communication terminal, and automatically storing the deciphered second kind of message in said nonerasable integrated circuit memory device in which each of the first kind of messages has been stored.

11. An integrated circuit card device according to claim 10, wherein the first and second kinds of messages are stored in said nonerasable integrated circuit memory device such that they are stored in different data storage areas of said integrated circuit memory.

12. An integrated circuit card device according to claim 11, wherein the first and second kinds of messages are stored in said nonerasable integrated circuit memory device with data for distinguishing between the first and second kinds of messages.

* * * * *